(12) United States Patent
McCracken

(10) Patent No.: US 9,445,553 B2
(45) Date of Patent: Sep. 20, 2016

(54) POSITIONING SYSTEM

(75) Inventor: Oliver Wendell McCracken, Pauls Valley, OK (US)

(73) Assignee: The Limb Saw Company LLC, Norman, OK (US)

( * ) Notice: Subject to any disclaimer, the term of this patent is extended or adjusted under 35 U.S.C. 154(b) by 36 days.

(21) Appl. No.: 13/398,465

(22) Filed: Feb. 16, 2012

(65) Prior Publication Data

US 2012/0275846 A1    Nov. 1, 2012

Related U.S. Application Data

(62) Division of application No. 11/827,485, filed on Jul. 11, 2007, now abandoned.

(51) Int. Cl.
| | | |
|---|---|---|
| *A01G 23/091* | (2006.01) | |
| *A01G 23/08* | (2006.01) | |
| *A01G 23/083* | (2006.01) | |
| *A01G 23/095* | (2006.01) | |
| *B27B 17/00* | (2006.01) | |
| *B27B 17/12* | (2006.01) | |
| *A01G 3/08* | (2006.01) | |

(52) U.S. Cl.
CPC ............. *A01G 23/091* (2013.01); *A01G 3/086* (2013.01); *A01G 23/08* (2013.01); *A01G 23/083* (2013.01); *A01G 23/095* (2013.01); *B27B 17/0083* (2013.01); *B27B 17/12* (2013.01); *Y10T 403/32237* (2015.01)

(58) Field of Classification Search
CPC .. A01G 23/081; A01G 23/091; A01G 23/08; A01G 23/083; A01G 23/087; A01G 23/095
USPC ....... 144/34.1, 336, 338, 24.13; 241/101.72; 56/239–243, 332–340; 414/704, 709, 414/721, 734
See application file for complete search history.

(56) References Cited

U.S. PATENT DOCUMENTS

| | | | | |
|---|---|---|---|---|
| 4,063,359 A | * | 12/1977 | Luscombe | .................. 30/379.5 |
| 4,121,777 A | * | 10/1978 | Kolstad et al. | ................. 241/58 |
| 4,470,441 A | * | 9/1984 | Wirsbinski et al. | ....... 144/195.1 |

FOREIGN PATENT DOCUMENTS

WO    WO 2006000808 A2 *  1/2006

* cited by examiner

*Primary Examiner* — Matthew G Katcoff

(57) ABSTRACT

A positioning system for attachment to a vehicle for operation of a power tool by a ground-based operator sitting in the vehicle provides a telescoping mast attached to the vehicle, a pivot bracket connecting an upper arm to the upper portion of the telescoping mast, mounting means for mounting the power tool on the upper arm; and power means for operating the power tool from the operator's position in the vehicle.

10 Claims, 13 Drawing Sheets

POSITIONING SYSTEM

BACKGROUND OF THE INVENTION

1. Field of the Invention

This invention relates to a positioning system for placing a tree saw or other tool in a desired location. When used in conjunction with a tractor having a bucket and a hydraulic source, a saw powered by a hydraulic motor is pivotally attached to the upper end of a telescoping mast. The mast is attached to the bucket or to the bucket's supporting frame. The tractor operator moves the tractor to the desired location, adjusts the position of the telescoping mast using the bucket controls, places the tree saw in an appropriate elevated work position with respect to a limb targeted for pruning or removal, and then prunes or removes the target limb. The positioning system can also be used to locate a treatment nozzle (for applying pesticides and herbicides) in a convenient elevated work position.

Although the present positioning system invention is described in considerable detail with respect to a tree saw, it will be understood by one skilled in the art that the positioning system of the present invention is suitable for placement of any tool in a proper elevated position for use in trees. Similarly, the positioning system can be used, by way of illustration and not by way of limitation, in conjunction with electrically operated tree saws, pneumatic tree saws, circular saws, chain saws, reciprocating saws, shear-tools, air nozzles, and chemical treatment devices.

2. Discussion

Larger tree limbs are removed typically by sawing. A man lift or, in some instances, a loader dirt bucket, holds a worker aloft and the worker uses a hand-held saw to remove the target limb. This procedure is dangerous and usually requires two workers. Gasoline-powered chain saws are not especially fuel efficient as compared with mobile power units such as diesel-powered farm tractors. Larger engines of the type used on farm tractors, front end loaders, skid loaders, and other heavy equipment must comply with emission standards, whereas small engines have not been regulated. In particular, chain saws powered by 2-cycle engines burning gasoline or gasoline-oil mixtures burn more fuel and emit more pollutants than larger tractor engines.

Smaller tree limbs are also removed typically by sawing. In many instances, the smaller tree limbs are removed by the same procedure as larger tree limbs. In the alternative, the worker may stand on the ground and support a small pruning saw attached to the end of a telescoping mast. Sometimes a worker climbs the tree and pulls a chain saw up by a rope. Myriad dangers attach to the worker's use of a power saw of any kind from a perch in a tree. In addition, the precarious position of the worker reduces the worker's productivity.

Commercial tree trimmers sometimes use a single-purpose vehicle dedicated to the tree trimming process. In one such device, a 215-horsepower diesel engine powers a machine which travels on low-ground-pressure tires. Its cutter uses seven circular saw blades which can cut at two different angles simultaneously at a height of up to 30 feet.

Mowing decks are available for attachment to tractors and heavy equipment, but the mowing decks are unsuitable for cutting tree limbs.

Neither commercial tree trimming devices nor mowing decks are well suited for medium duty tree trimming required for pruning relatively smaller fruit trees such as pear trees, peach trees, apricot trees, and apple trees or relatively larger trees such as pecan trees and walnut trees.

The positioning system of the present invention provides a method an apparatus for using a power saw at elevated locations in conjunction with mobile vehicles such as farm tractors, backhoes, skid loaders, and all-terrain vehicles (ATVs). The positioning system provides increased fuel economy as compared to hand-held saws while requiring only a single worker. In addition, the ability to position tools quickly results in increased productivity.

SUMMARY OF THE INVENTION

A positioning system for operation—especially elevated operation—of tree saws, spraying equipment, and similar devices provides a telescoping mast, an upper arm terminating in a mounting plate on which the tree saw, spraying equipment, or similar device is mounted. Hydraulic cylinders facilitate the telescoping action of the mast and the positioning of the equipment.

An object of the present invention is to provide a positioning system for elevated operation of tree saws and other tools by a single worker who remains in the operator's seat of a vehicle such as a tractor, a backhoe, a skid loader, a pickup, or an ATV.

Another object of the present invention is to provide a positioning system for elevated operation of tree saws and other tools wherein the worker is not required to be elevated.

Another object of the present invention is to provide a positioning system for elevated operation of tree saws and other tools wherein the worker is protected from the operating tools and falling limbs.

Other objects, features, and advantages of the present invention will become clear from the following description of the preferred embodiment when read in conjunction with the accompanying drawings and appended claims.

DETAILED DESCRIPTION OF THE INVENTION

In the following description of the invention, like numerals and characters designate like elements throughout the figures of the drawings.

Figure 1:
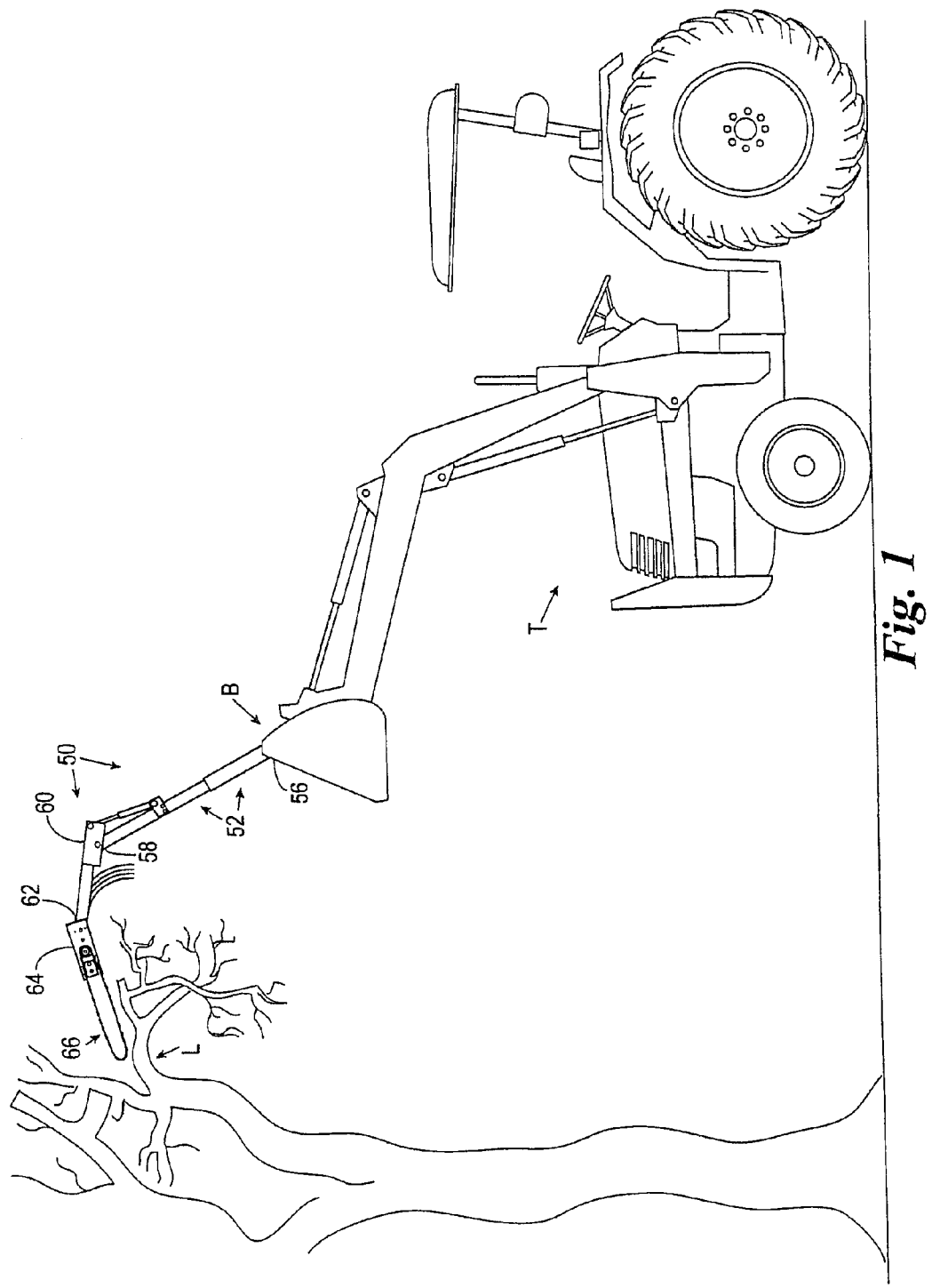
FIG. 1 shows the positioning system according to the present invention attached to a dirt bucket on a farm tractor wherein a hydraulically powered chain saw is attached to an upper arm.

Referring generally to the drawings and more particularly to FIG. 1, a positioning system 50 with an attached hydraulic chain saw consists of a telescoping mast assembly 52 attached to the dirt bucket B of a tractor T and an upper arm 54 supported by the telescoping mast assembly 52. The telescoping mast assembly 52 has a lower end portion 56 and an upper end portion 58. The upper arm has a proximate end 60 and a distal end 62. The proximate end 60 of the upper arm is pivotally attached to the upper end portion 58 of the telescoping mast assembly 52. A mounting plate 64 attached to the distal end 62 of the upper arm 54 by bolts 63, 65 (See FIG. 2) supports a chain saw assembly 66. Thus the tractor operator can position the tractor T beneath a tree and raise or lower the dirt bucket B of the tractor T to adjust the height of the chain saw assembly 66 with respect to a tree limb L selected for pruning or removal.

Figures 2, 3:
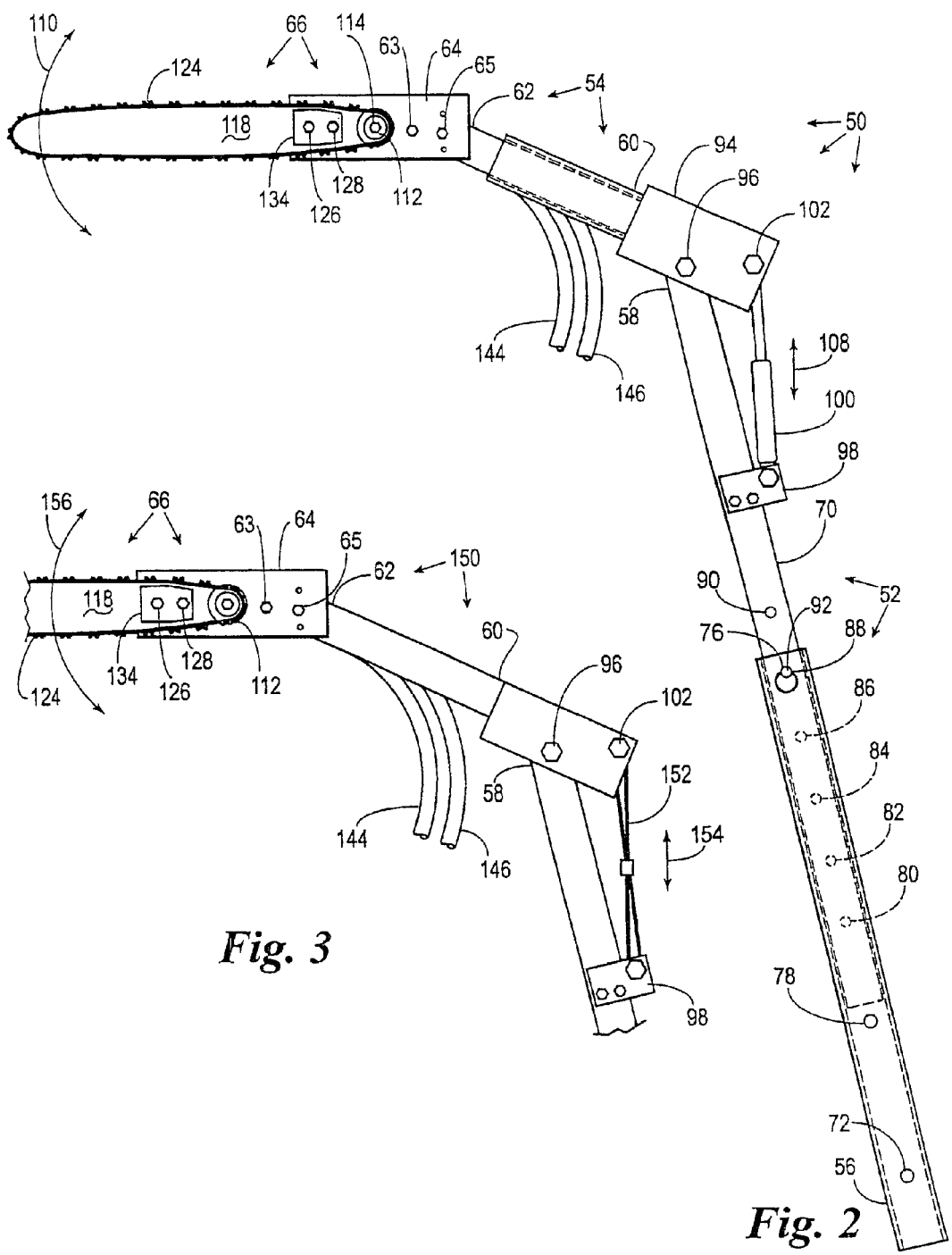
FIG. 2 is a view of the positioning system shown in, FIG. 1 removed from the farm tractor.
FIG. 3 shows another positioning system according to the present invention including a limit strap.
Figure 4:
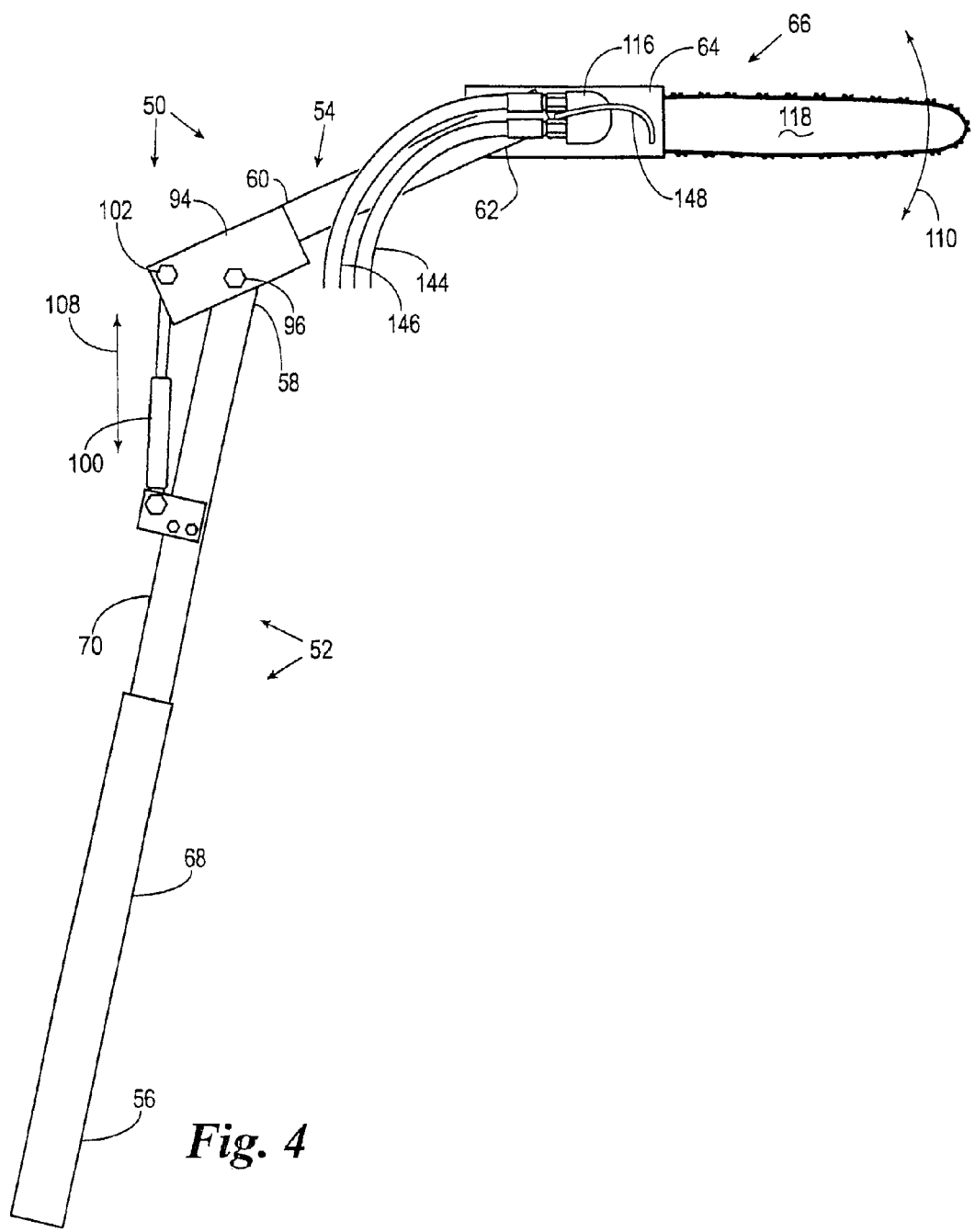
FIG. 4 is another view of the positioning system shown in FIG. 1.

Referring now to FIGS. 2 and 4, the telescoping mast assembly 52 of the positioning system 50 consists of an outer mounting member 68 and an slidably extending inner member 70. The outer mounting member 68 has bores 72, 74 for attachment to the side of the dirt bucket B of the tractor T using suitable bolts (not shown). A locking pin bore 76 is aligned with a selected bore 88 of spaced bores 78, 80, 82, 86, 88, 90 in the slidably extending inner member 70. A locking pin 92 extends through the locking pin bore 76 in the outer mounting member 68 and the spaced bore 88 in the slidably extending inner member 70. Thus the telescoping mast assembly 52 provides a second point of adjustment of the height of the chain saw assembly 66 above the tractor T, thereby increasing the elevation at which the chain saw assembly 66 can be used to prune or remove tree limbs.

Still referring to FIGS. 2 and 4, a pivot bracket 94 rigidly attached to the proximate end 60 of the upper arm 54 is pivotally attached to the upper end portion 58 of the telescoping mast assembly 52 by a pivot bolt 96. A mounting bracket 98 attached to the slidably extending inner member 70 receives one end of a hydraulic cylinder 100. The other end of the hydraulic cylinder 100 is attached to a bolt 102 extending through the bracket 94. Hydraulic lines 104, 106 (See FIG. 5) provide control for the hydraulic cylinder 100, so the operator's extension/retraction of the hydraulic cylinder along arrow 108 causes movement of the chain saw assembly 66 along arrow 110.

Still referring to FIGS. 2 and 4, the mounting plate 64 attached to the distal end 62 of the upper arm 54 supports the chain saw assembly 66. A chain saw sprocket drive 112 driven by a shaft 114 from a hydraulic motor 116 (See FIG. 4) is aligned with a standard chain saw blade 118 (sometimes also referred to as the chain saw bar) having elongated slots 120, 122 (See FIGS. 10-11) for tension adjustment. A chain 124 engages the chain saw sprocket drive 112. The position of the chain saw blade 118 with respect to the sprocket drive 112 determines the tension on the chain 124. Bolts 126, 128 extending through bores 130, 132 in a chain saw blade locking plate 134, through the elongated slots 120, 122 in the chain saw blade 118, and through bores 136, 138 in the mounting plate 64 (See FIGS. 10-11) are secured by nuts 140, 142 (See FIGS. 10-11). Hydraulic lines 144, 146 connect the hydraulic motor 116 to a hydraulic power source (not shown) on the tractor T. An oil line 148 provides gravity feed of oil from an oil reservoir (See FIG. 6) to the chain 124.

Referring now to FIG. 3, another positioning system 150 according to the present invention includes a limit strap 152 connecting the mounting bracket 98 and the bolt 102 in the pivot bracket 94. The limit strap 152 permits limited movement of the bolt 102 with respect to the mounting bracket 98 along arrow 154, thereby permitting the chain saw assembly 66 to move upwardly along arrow 156 in response to resistance from the targeted limb while preventing the chain saw assembly 66 from dropping downwardly along arrow 156 past a position wherein the chain saw assembly 66 can not be used.

It will be understood by one skilled in the art that a chain saw works best when the weight of the chain saw provides the force for making the cut in the target limb L. It will be further understood by one skilled in the art that the chain saw assembly 66 shown in FIG. 3 relies solely on the weight of the chain saw assembly 66, whereas the hydraulic cylinder 108 shown in FIG. 2 permits the operator to apply a slight downward force to the chain saw assembly 66 during the cutting process.

Figure 5:
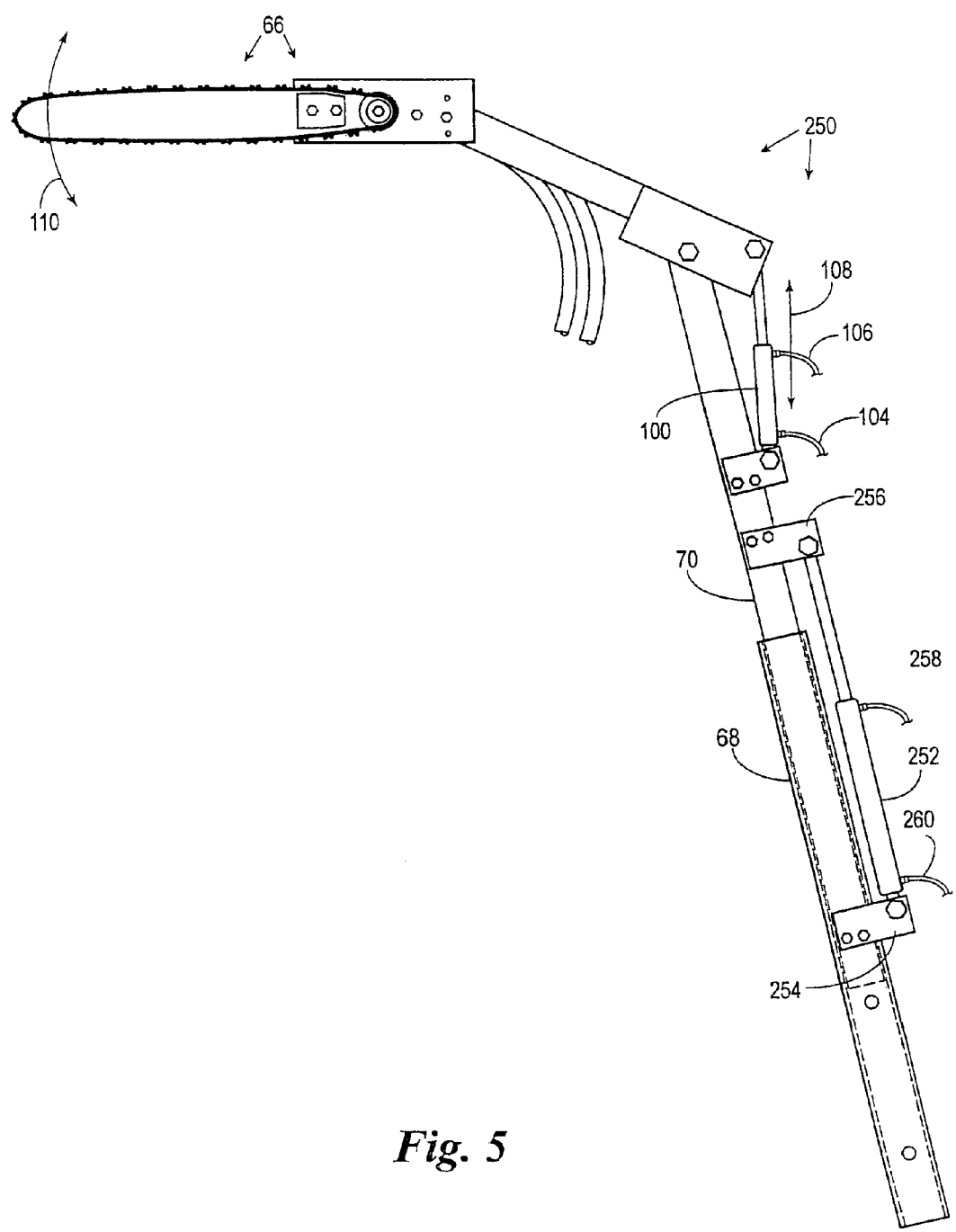
FIG. 5 shows another positioning system according to the present invention wherein the telescoping mast is power operated.

Referring now to FIG. 5, another positioning system 250 according to applicant's invention includes a telescoping mast hydraulic cylinder 252 attached at one end to a bracket 254 attached to the outer mounting member 68 of the telescoping mast assembly 52 and at the other end to a bracket 256 attached to the slidably extending inner member 70 of the telescoping mast assembly 52. Hydraulic lines 258, 260 connect the telescoping mast hydraulic cylinder 252 to a hydraulic power source (not shown) on the tractor T. The positioning system 250 shown in FIG. 5 permits hydraulic control of both the telescoping mast assembly 52 by the telescoping mast hydraulic cylinder 252 and the saw blade assembly 66 by the hydraulic cylinder 100. It will be understood by one skilled in the art that the positioning system 252 shown in FIG. 5 is a modification of the positioning system 50 shown in FIGS. 1, 2, and 4, wherein the modification consists of the use of the telescoping mast hydraulic cylinder 252 to control the length of the telescoping mast assembly 52 and eliminates the need for the locking pin 92.

Figure 6:
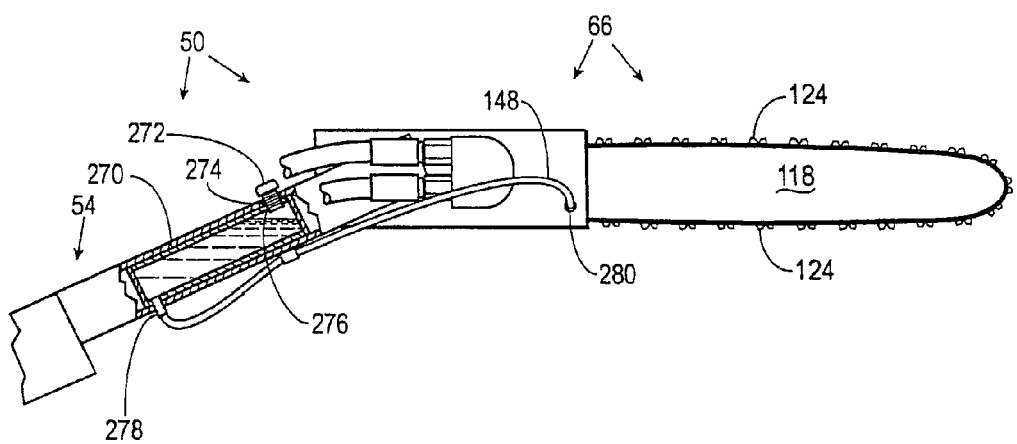
FIG. 6 is a view of the upper arm of the positioning system shown in FIGS. 1, 2, and 4 wherein a portion of the upper arm is cut away to show a chain oil (sometimes also called bar and blade oil) reservoir.

Referring now to FIG. 6, the upper arm 54 of the positioning system 50 houses a chain oil reservoir 270. A threaded vented cap 272 extends through an bore 274 in the upper arm 54 to engage a threaded bore 276 in the chain oil reservoir 270. A chain oil reservoir fitting 278 in the oil reservoir 270 permits chain oil to flow from the chain oil reservoir 270 through the chain oil line 148 to a mounting plate fitting 280 and through a spacer 282 containing chain oil transfer channels 284, 286, 288, and 290 (See FIG. 11).

Referring now to FIG. 6 in conjunction with FIGS. 1-5, the chain oil from the chain oil reservoir 270 is gravity fed through the oil line 148 to the mounting plate fitting 280 when the chain saw assembly 66 extends downwardly from the pivot plate 94 after cutting the target limb L (See especially FIG. 1). The bore 274 is sized so as to permit the threaded vented cap 272 to pass through the bore 274 with slight clearance. When the threaded vented cap 272 is threaded into the threaded bore 276 in the chain oil reservoir 270, the threaded vented cap 272 secures the chain oil reservoir 270 within the upper arm 54. Although square tubing is especially well suited for disposing a relatively smaller size within a relatively larger size to achieve a snug fit of the smaller square tubing within the larger square tubing, the upper arm 54 and the chain oil reservoir 270 can be of any suitable configuration.

Figure 7:
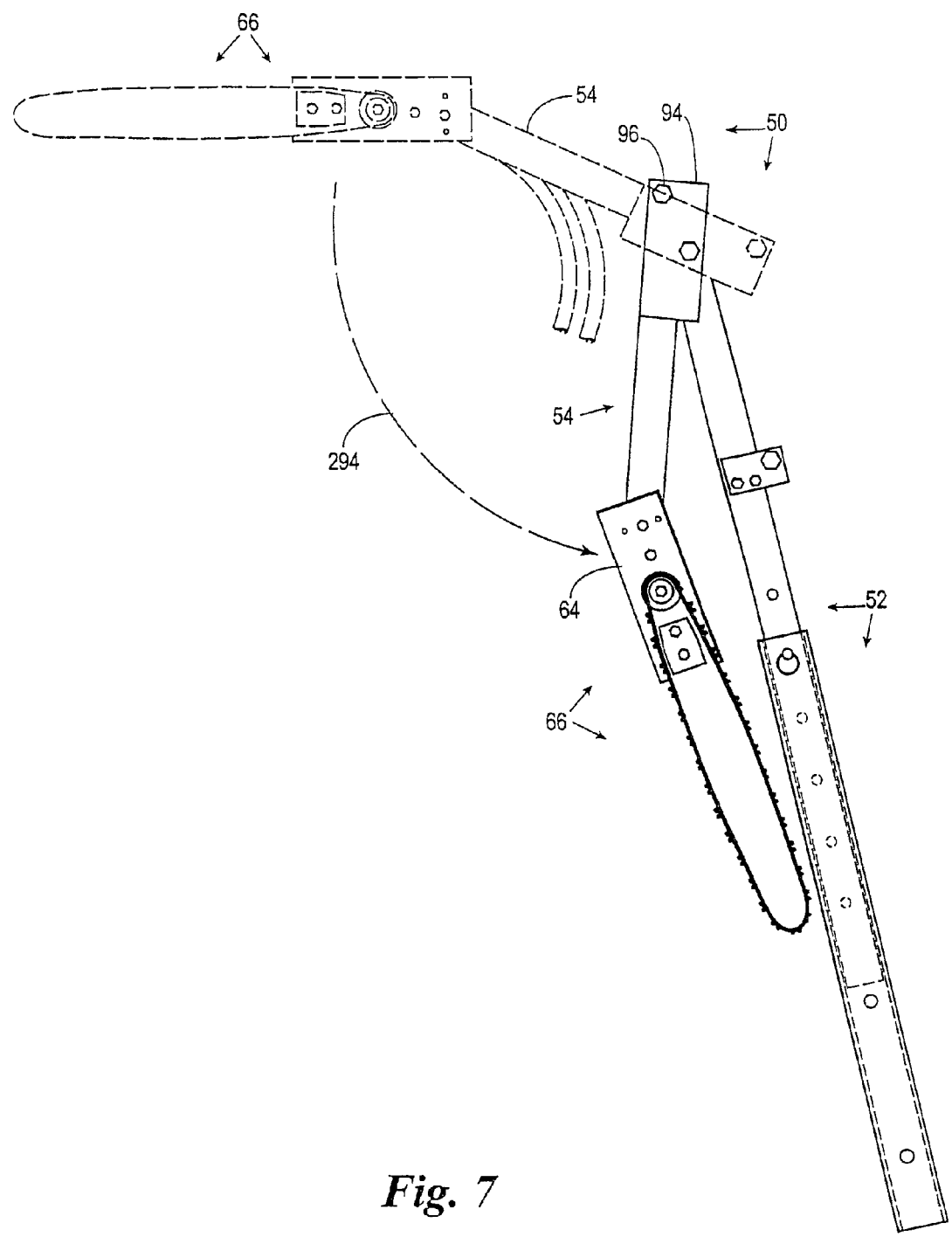
FIG. 7 is another view of the positioning system shown in FIGS. 1-6 wherein the upper arm is folded alongside the telescoping mast for storage and transport.

Referring now to FIG. 7, detachment of the hydraulic cylinder 100 of the positioning systems 50 and 250, or disconnection of one end of the limit strap 152 of the positioning system 150, permits the upper arm 54 to pivot on the pivot bolt 96 so the upper arm 54, the mounting plate 64, and the saw assembly 66 (or other tool attached to the mounting plate 64) can swing along an arc 294 between an extended use position, shown in phantom, and a folded storage position.

Figure 8:
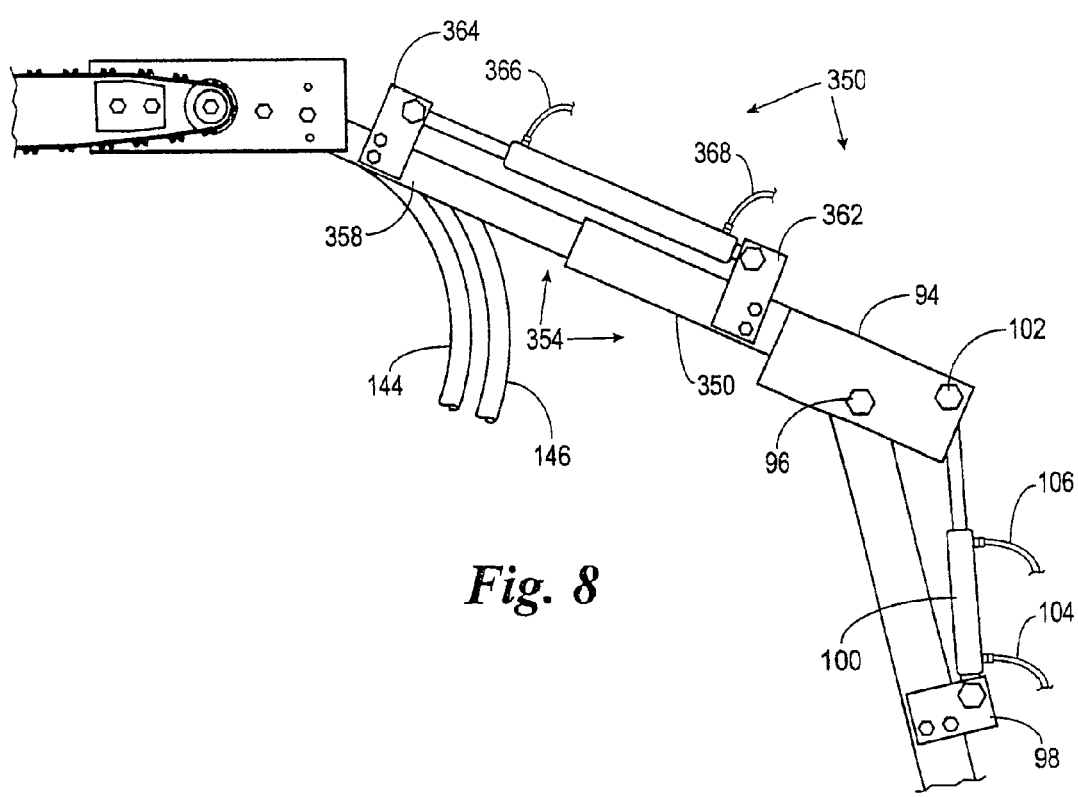
FIG. 8 is an enlarged detail of another positioning system according to applicant's invention.

Referring now to FIG. 8, another positioning system 350 has a telescoping upper arm 354 consisting of a telescoping upper arm outer member 356 and a slidably extending inner member 358 for locating the mounting plate 64 (and the saw assembly 66 attached thereto) at a convenient position distal from the pivot bracket 94. A telescoping upper arm hydraulic cylinder 360 is attached at one end to a bracket 362 on the outer member 356 of the telescoping upper arm 354 and at the other end to a bracket 364 on the slidably extending inner member 358 of the telescoping upper arm 354. Hydraulic lines 366, 368 connect the telescoping upper arm 354 hydraulic cylinder 360 to a hydraulic power source (not shown) on the tractor T.

Figure 9:
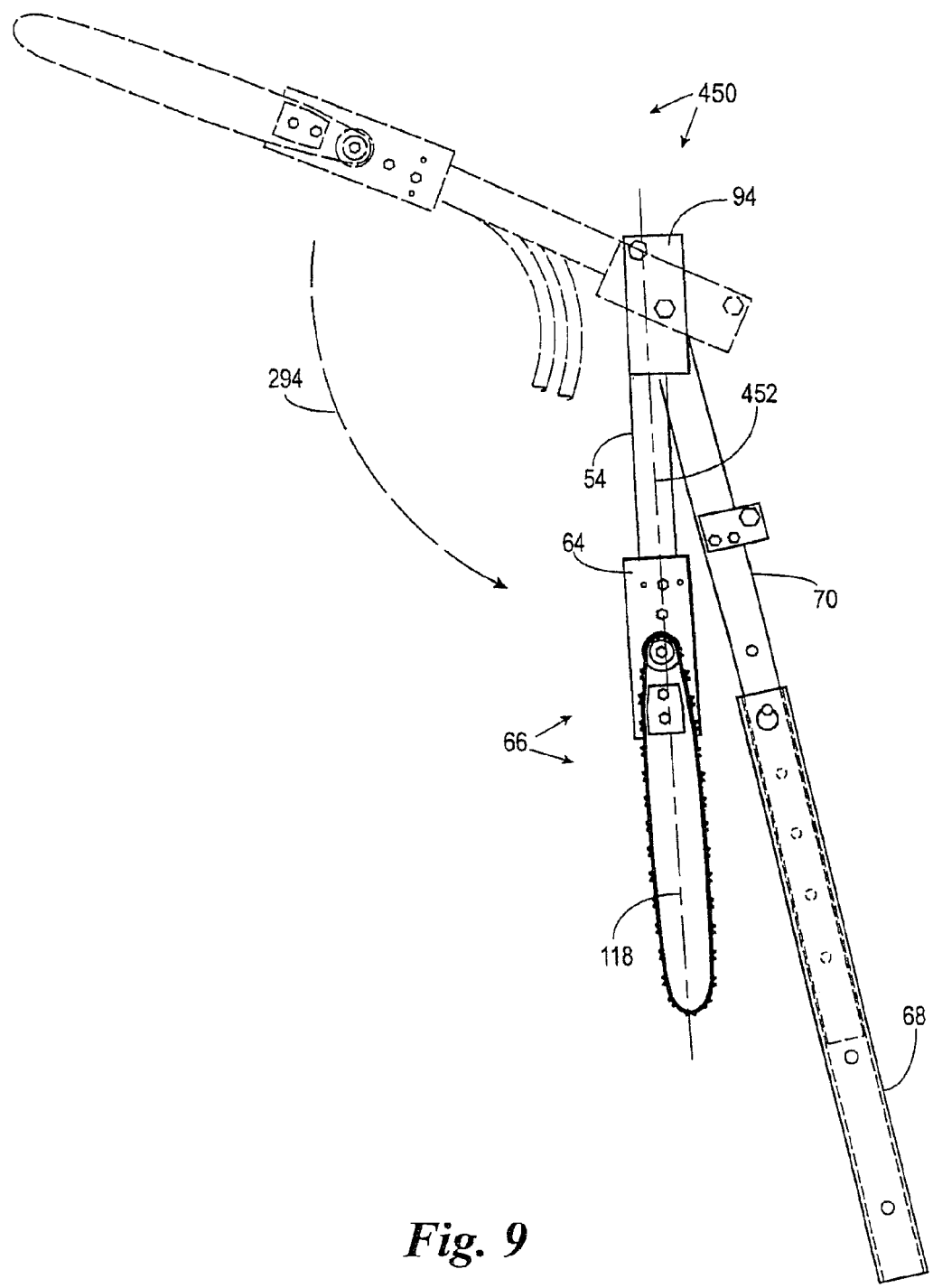
FIG. 9 is a view of another positioning system according to the present invention wherein the chain saw blade is generally aligned with the upper arm.

Referring now to FIG. 9, another positioning system 450 is similar to the positioning system 50 shown in FIG. 7 except for the longitudinal alignment of the pivot bracket 94, upper arm 54, the mounting plate 64, and the saw blade 118 along a common center line 452. The alignment along the common center line 452 permits a more compact arrangement when the saw assembly 66, the mounting plate 64, and the upper arm 54 are folded along 294 for storage.

Figures 10, 11:
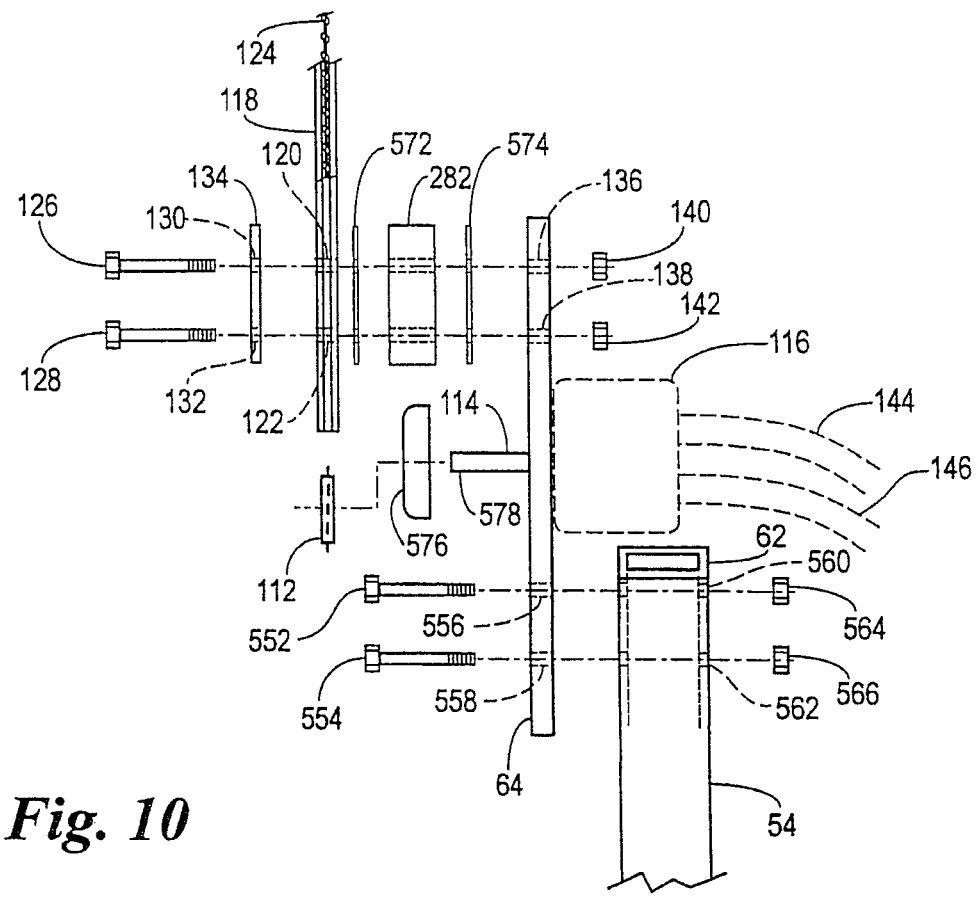
FIG. 10 is an exploded view showing the hydraulically powered chain saw assembly shown in FIGS. 1-9.
FIG. 11 is an enlarged view of a spacer block with oiling grooves.

Referring now to FIGS. 10 and 11, the mounting plate 64 is attached near the distal end 62 of the upper arm 54 by bolts 552, 554 disposed through bores 556, 558, respectively in the mounting plate 64, through bores 560, 562, respectively near the distal end of the upper arm 54, and secured by nuts 564, 566, respectively. The mounting plate 64 attached to the distal end 62 of the upper arm 54 supports the chain saw assembly 66. The chain saw sprocket drive 112 driven by the shaft 114 from the hydraulic motor 116 is aligned with the chain saw blade 118 having elongated slots 120, 122 for tension adjustment. The chain 124 engages the chain saw sprocket drive 112. The position of the chain saw blade 118 with respect to the sprocket drive 112 determines the tension on the chain 124. Bolts 126, 128 extending through bores 130, 132 in the chain saw blade locking plate 134, through the elongated slots 120, 122 in the chain saw blade 118, and through bores 136, 138 in the mounting plate 64 are secured by nuts 140, 142. Hydraulic lines 144, 146 connect the hydraulic motor 116 to a hydraulic power source (not shown) on the tractor T. An oil line 148 provides gravity feed of oil from an oil reservoir (See FIG. 6) to the chain 124.

Still referring to FIGS. 10 and 11, the spacer 282 is held between the saw blade 118 and the mounting plate 64 by bolts 126, 128 secured in place by nuts 140, 142, respectively. An adapter 576 is keyed inwardly to the shaft 114 and outwardly to the drive sprocket 112. The drive sprocket 112 and the adapter 576 are secured to the keyed end 578 of the shaft 114 by a set screw (not shown). It will be understood by one skilled in the art that the drive sprocket 112 and the adapter 576 may, optionally, be integrated in a single drive sprocket keyed inwardly to the shaft 114.

Referring now to FIG. 11, the spacer 282 includes oiling channels 284, 286 on one side and oiling channels 288, 290 (not shown) on the other side. The oiling channels permit chain oil to move from the mounting plate fitting 280 (See FIG. 4) to mating oiling channels in the saw blade 118. It will be understood by one skilled in the art that oiling channels are standard construction for chain saw blades and are well known in the art. Bores 582, 584 in the spacer 282 connect oiling channels on opposite sides of the spacer 282. Bores 586, 588 receive bolts 126, 128, respectively for attachment of the saw blade 118 to the mounting plate 64. It will be further understood by one skilled in the art that the thickness of the spacer 282 is a design choice dictated solely by the need to align the saw blade 118 with the drive sprocket 112.

Figure 12:
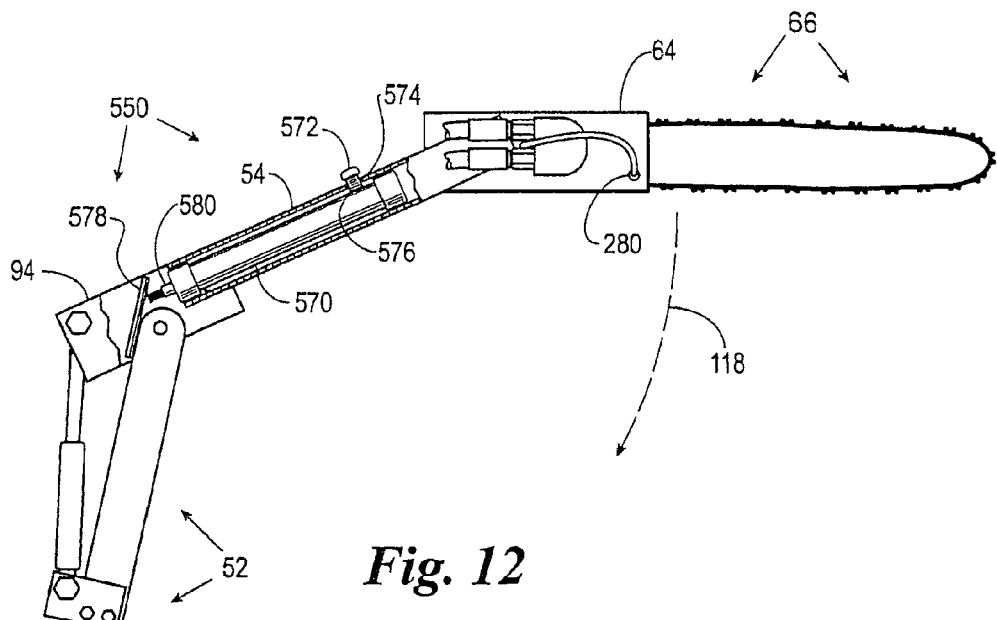
FIG. 12 shows another positioning system according to the present invention wherein the upper arm contains an automatic oiler for oiling the chain saw attached to the upper arm.

Referring now to FIGS. 12-15, another positioning system 550 according to applicant's invention includes a chain oil reservoir 570 within the upper arm 54. A threaded unvented cap 572 extends through an bore 574 in the upper arm 54 to engage a threaded bore 576 in the chain oil reservoir 570. As illustrated in FIG. 12, a pump assembly 580 (See FIG. 14) automatically pumps chain oil from the chain oil reservoir 570 to the chain 124 on the blade 118 each time the upper arm 54 and the chain saw assembly 66 mounted thereon are forced against a target limb L along arrow 118. An actuating member 578 attached to the upper end portion 58 of the telescoping mast assembly 52 contacts a spring-biased open piston 582 in hydraulic communication with a cylinder 583. A suction check valve 584 connected the cylinder 583 to the chain oil reservoir 570 prevents chain oil from flowing from the cylinder 583 into the reservoir 570, while a discharge check valve 586 permits oil to flow through the oil line 148 to the mounting plate fitting 280 on the mounting plate 64 and then through the spacer 282 to oil the chain 124.

Figure 13:
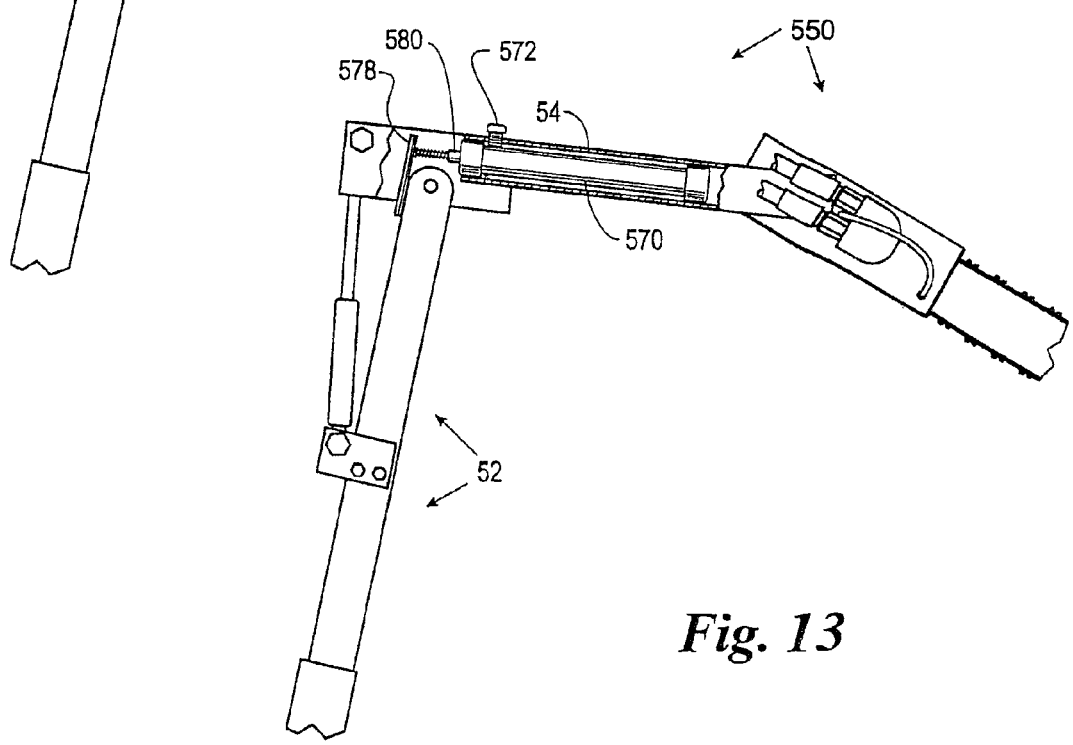
FIG. 13 is another view of the positioning system shown in FIG. 12.
Figure 14:
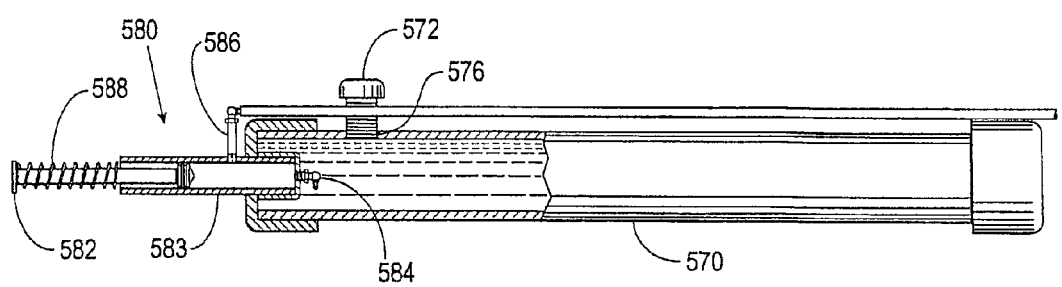
FIG. 14 is a detailed enlarged view of the automatic oiler shown in FIGS. 12-13.
Figure 15:
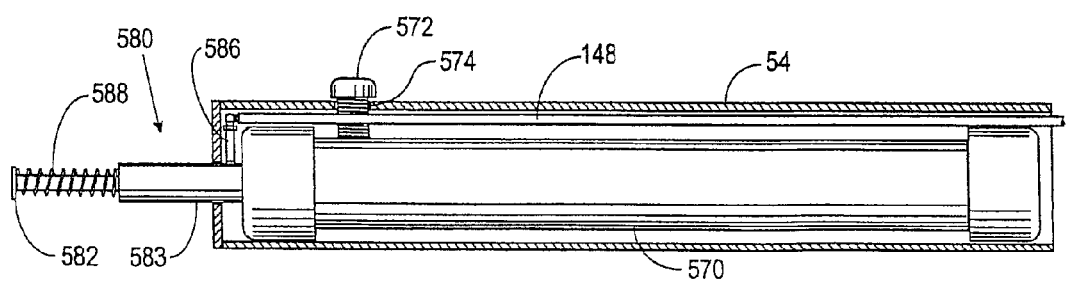
FIG. 15 is another view of the automatic oiler shown in FIGS. 12-14.

Still referring to FIGS. 12-15 and more particularly to FIG. 13, when the force on the actuating member 578 is relieved, a spring 588 effects a suction stroke. Chain oil is prevented from flowing backward through the discharge check valve 586 into the cylinder 583, so chain oil is drawn into the cylinder 583 through the suction check valve 584. When the upper arm 54 is once again moved downwardly along arrow 118 against a target limb L, the pump assembly 580 once again delivers oil to the chain.

Although the chain saw assembly 66 described herein is powered by a hydraulic motor, it will be understood by one skilled in the art that the chain saw assembly could also be powered by a pneumatic motor (requiring only a singly air line for power) or an electric motor (requiring an electric power line and a generator. Similarly, pneumatic positioners could be used in place of the hydraulic cylinders 100, 252.

Figure 16:
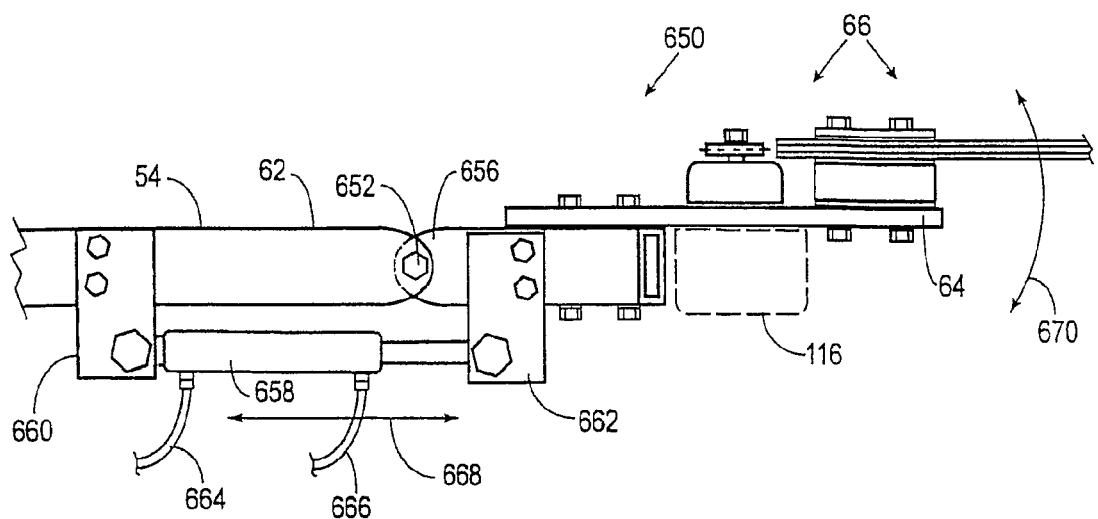
FIG. 16 shows another upper arm assembly according to the present invention wherein the hydraulically powered chain saw swings laterally from the end of the upper arm.

Referring now to FIG. 16, a top view of another positioning system 650 is shown with the telescoping mast assembly 52, the pivot bracket 94, and the proximate end portion 60 of the upper arm 54 cut away. A vertical pivot bolt 652 disposed in vertical bores (not shown) near the distal end 62 of the upper arm 54 and through aligned vertical bores 654 (not shown) in mating horizontal tabs 656 secured to the mounting plate 64. A hydraulic cylinder 658 is attached on one end to a bracket 660 on the upper arm 54 and on the other end to a bracket 662 on one of the horizontal tabs 656. Hydraulic lines 664, 666 connect the hydraulic cylinder 658 to a hydraulic power source (not shown) on the tractor T. Operation of the hydraulic cylinder 658 along 668 causes the mounting plate 64 and the chain saw assembly 66 (or other tool attached to the mounting plate 64) to swing laterally along arrow 670.

Figure 17:
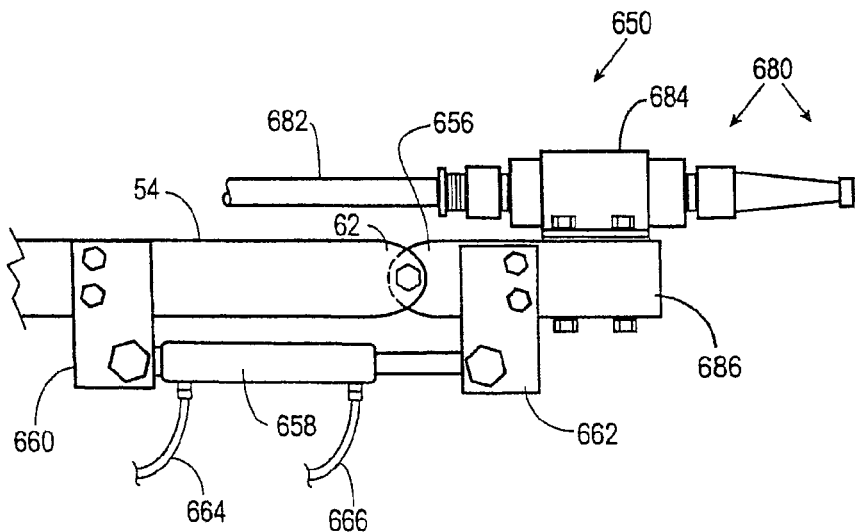
FIG. 17 shows a nozzle mounted on the end of the upper arm for elevated treatment of trees utilizing pesticides, herbicides, air, or compressed gas.

Referring now to FIG. 17, the positioning system 650 shown in FIG. 16 provides positioning of a nozzle assembly 680 connected to a supply hose 682. The supply hose 682 may provide air for thinning fruit, an appropriate chemical mixture for spraying trees and other plant life, or paint for use on difficult-to-reach locations. A collar 684 secures the nozzle assembly 680 to an adaptor 686.

Figure 18:
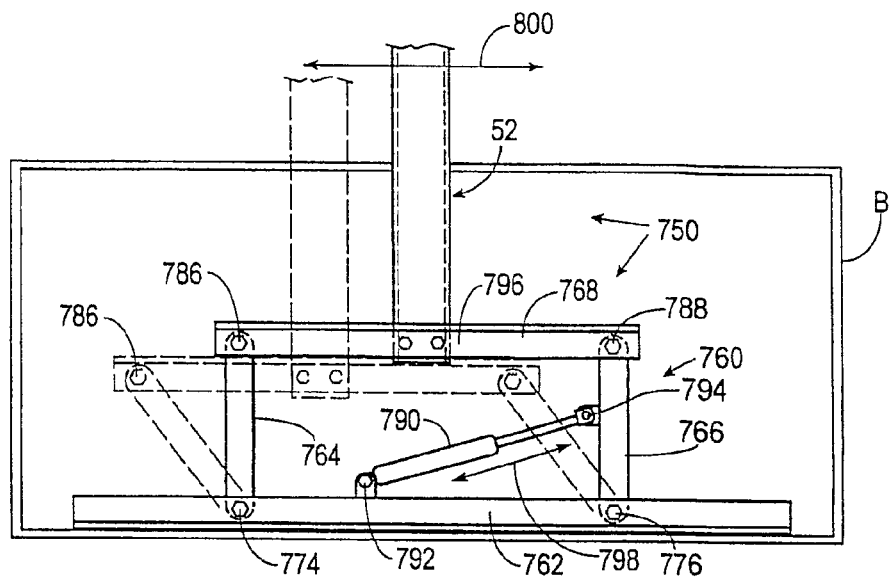
FIG. 18 shows another positioning system according to the present invention wherein a four-point linkage is attached to the bottom of a tractor's dirt bucket.
Figure 19:
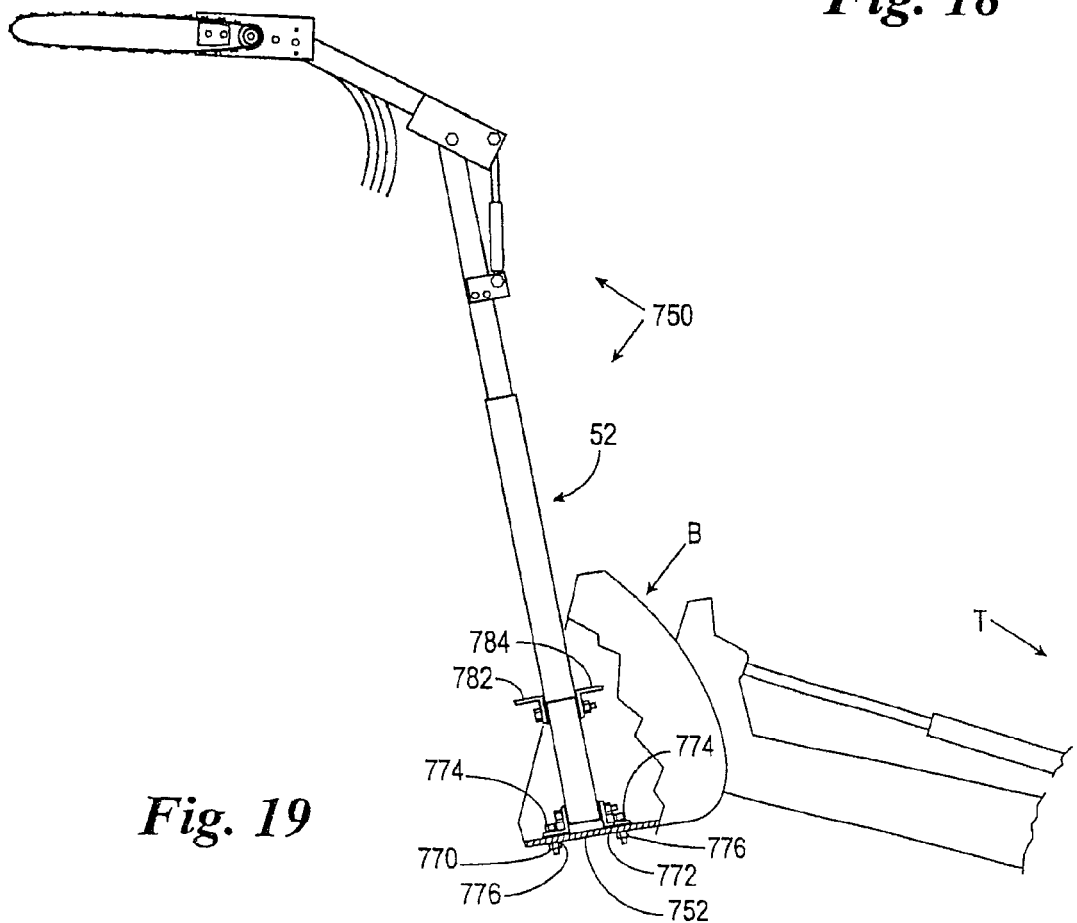
FIG. 19 is another view of the positioning system shown in FIG. 18 with the side of the dirt bucket cut away to show attachment of the telescoping mast to four-point linkage.

Referring now to FIGS. 18 and 19, another positioning system 750 is shown mounted in inner bottom 752 of a dirt bucket B. A four-point linkage assembly 760 is formed by a horizontal base 762, parallel vertical members 764, 766 of equal length, and a horizontal top 768. The horizontal base 762 consists of two parallel L-shaped members 770, 772 secured to the inner bottom 752 of the dirt bucket B by bolts 774 and nuts 776. One end of the vertical member 764 is pivotally attached to the horizontal base 762 by a left bottom pivot bolt 778, and one end of the parallel vertical member 766 is pivotally attached to the horizontal base 762 by a right bottom pivot bolt 780. The horizontal top 768 consists of two parallel L-shaped members 782, 784. The other end of the vertical member 764 is pivotally attached to the horizontal top 768 by a left top pivot bolt 786, and the other end of the vertical member 766 is attached to the horizontal top 768 by a right top pivot bolt 788. A hydraulic cylinder 790 is attached at one end to a mounting tab 792 attached to the horizontal base 762. The other end of the hydraulic cylinder 790 is attached to a mounting tab 794 located on the inside of the vertical member 766. The telescoping mast assembly 52 is attached to a middle portion 796 of the horizontal top 768. Movement of the hydraulic cylinder 790 along 798 causes the telescoping mast assembly 52 to move responsively along 800 while maintaining the telescoping mast assembly 52 perpendicular to the horizontal top 768.

The present invention has been described as a positioning system because it is adaptable for use with a variety of ground-based vehicles to which the telescoping mast assembly 52 is attached. The telescoping mast assembly 52, and thus applicant's positioning system generally, can be attached, by way of illustration and not by way of limitation, to an upstanding sidewall of a pickup bed, to a bale spike frame, to a skid loader, to a backhoe, or to an ATV. While attachment to a pickup bed may not permit use of hydraulic cylinders, an air compressor mounted in the pickup bed can be used to operate pneumatic cylinders (also referred to herein as pneumatic positioners).

It will also be understood by one skilled in the art that the present positioning system invention is well suited for placing a variety of tools in hard-to-reach locations such as trees.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A positioning system for attachment to a vehicle for operation of a chain saw for cutting a severable member by a ground-based operator sitting in the vehicle, the positioning system comprising:
   (a) a mast having an upper portion and a lower portion, wherein said lower portion is attached to the vehicle;
   (b) an upper arm comprising a proximate end and distal end, the distal end further comprising a chainsaw, the chain saw having a weight and further comprising a cutting edge;
   (c) a pivot bolt interconnecting the proximate end of the upper arm to the upper portion of the mast wherein the pivot bolt is configured to allow for pivotal movement of the upper arm relative to the mast between predetermined limits;
   (d) a limit strap disposed along the mast and interconnected to the upper arm and the mast, wherein the limit strap is configured to limit pivotal movement of the upper arm and chain saw after the severable member has been cut; and
   (e) a source of power for the chain saw from the operator's position in the vehicle;
   (f) wherein the cutting edge self feeds when the chain saw is energized by the operator;
   (g) a four-point linkage consisting of a horizontal base attached to the vehicle, a horizontal top, two parallel vertical members, each parallel vertical member pivotally attached at one end to the horizontal base and pivotally attached at the other end to the horizontal top.

2. The positioning system of claim 1, wherein the lower portion of the mast is attached to a portion of a vehicle selected from the group consisting of a skid steer loader, a dirt bucket on a tractor, a pickup, and all terrain vehicle.

3. The positioning system of claim 1, wherein the chainsaw is powered by a motor selected from the group consisting of a hydraulic motor, a pneumatic motor, and an electric motor.

4. A positioning system for attachment to a vehicle for operation of a chain saw for cutting a severable member by a ground-based operator sitting in the vehicle, the positioning system comprising:
   (a) a mast having an upper portion and a lower portion, wherein said lower portion is attached to the vehicle;
   (b) an upper arm comprising a proximate end and distal end, the distal end further comprising a chainsaw, the chain saw having a weight and further comprising a cutting edge;
   (c) a pivot bolt interconnecting the proximate end of the upper arm to the upper portion of the mast wherein the pivot bolt is configured to allow for pivotal movement of the upper arm relative to the mast between predetermined limits;
   (d) a limit strap disposed along the mast and interconnected to the upper arm and the mast, wherein the limit strap is configured to limit pivotal movement of the upper arm and chain saw after the severable member has been cut; and (e) a source of power for the chain saw from the operator's position in the vehicle;

(f) a four-point linkage consisting of a horizontal base attached to the vehicle, a horizontal top, two parallel vertical members, each parallel vertical member pivotally attached at one end to the horizontal base and pivotally attached at the other end to the horizontal top; and (g) a telescoping mast having an upper end portion and a lower end portion, wherein the lower end portion is attached to the horizontal top wherein the chain saw cutting edge self feeds when the chain saw is energized by the operator.

5. The positioning system in claim 4, wherein telescoping mast further comprises:

(a) a telescoping mast hydraulic cylinder attached at one end to a bracket attached to the outer mounting member of the telescoping mast assembly and at the other end to a bracket attached to the slidably extending inner member of the telescoping mast assembly; and (b) hydraulic lines connecting the telescoping mast hydraulic cylinder to a hydraulic power source on the vehicle.

6. The positioning system of claim 4, wherein the upper arm is a telescoping upper arm further comprising:

(a) an upper arm outer member;

(b) a slidably extending inner member disposed within the upper arm outer member;

(c) a telescoping upper arm hydraulic cylinder attached at one end to a bracket on the upper arm outer member and at the other end to a bracket on the slidably extending inner member; and (d) hydraulic lines connecting the telescoping upper arm hydraulic cylinder to a hydraulic power source on the vehicle.

7. The positioning system of claim 4, wherein the lower portion of the mast is attached to a portion of a vehicle selected from the group consisting of a skid steer loader, a dirt bucket on a tractor, a pickup, and all terrain vehicle.

8. The positioning system of claim 4, wherein the chain saw is powered by a motor selected from the group consisting of a hydraulic motor, a pneumatic motor, and an electric motor.

9. The positioning system of claim 4 wherein the stop is a strap interconnecting the mast and the upper arm to permit free pivotal movement of the upper arm and therefore the chain saw during use of the chain saw in cutting a severable member while limiting pivotal movement of the upper arm and chain saw to predetermined amount after the severable member has been cut.

10. The positioning system of claim 4 wherein the stop is disposed along the mast the upper arm and the mast to permit free pivotal movement of the upper arm and therefore the chain saw during use of the chain saw in cutting a severable member while limiting pivotal movement of the upper arm and chain saw to a predetermined amount after the severable member has been cut.

* * * * *